3,194,831
18-NOR-D-HOMO ANDROSTANES

Hans Reimann, Bloomfield, and Eugene P. Oliveto, Glen Ridge, N.J., assignors to Schering Corporation, Bloomfield, N.J., a corporation of New Jersey
No Drawing. Filed Sept. 15, 1961, Ser. No. 138,272
14 Claims. (Cl. 260—488)

This invention relates to novel 18-nor-D-homo steroids and to methods for their manufacture. In general this invention relates to 17-keto-18-nor-D-homo-13(17a)-dehydro androstanes having saturated A, B, and C rings, and having at C-11 a hydroxyl group or ester thereof. More specifically, this invention relates to 11β-hydroxy-17-keto-13(17a)-dehydro-18-nor-D-homo - 5α - androstanes and 11β - hydroxy - 17-keto-13(17a)-dehydro-18-nor-D-homo-5β-androstanes and 11-esters thereof which are valuable as therapeutics per se, or as intermediates in the preparation of other valuable steroids, and to methods for their manufacture.

Among the compounds included in our invention are 18-nor-D-homo-13(17a)-dehydrosteroids of the following structural Formula I:

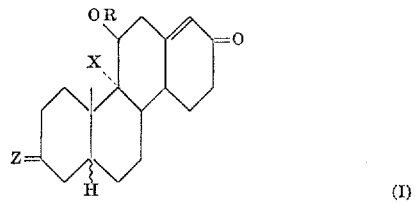

(I)

wherein R is a member of the group consisting of H and an acyl radical of an acid of the group consisting of sulfonic acids and carboxylic acids having up to 12 carbon atoms; X is a member of the group consisting of H and halogen; Z is a member of the group consisting of keto; (H,βOR') and (H,αOR')R' being a member of the group consisting of H and an acyl radical of an organic carboxylic acid having up to 12 carbon atoms.

The wavy line (∼∼∼) shown in the above formula signifies that the hydrogen bonded to the 5-carbon may be present in an alpha (5α-androstanes) or beta (5β-androstanes) position.

Illustrative of the acyl groups which may be present at C-3 and/or at C-11 are lower alkanoates such as formate, acetate, propionate, butyrate, isobutyrate, valerate, isovalerate, pravalate, caproate (n-hexanoate), enanthate; sulfonates such as methanesulfonate and p-toluenesulfonate; aromatic acyl radicals of aryl carboxylic acids such as benzoate and toluate, as well as the acyl portions of dibasic acids such as succinate and phthalate.

Novel A, B, and C-ring saturated 11β-hydroxy-18-nor-D-homo-5α- and 5β-androstanes of this invention are typified by compounds such as 18-nor-D-homo-5α-13(17a)-androstene-3β,11β-diol-17-one, the acetate and 3,11-diacetate esters thereof, 18-nor-D-homo-5β-13(17a)-androstene-11β-ol-3,17-dione, 9α-fluoro-18-nor-D-homo-5α-13(17a)-androstene-11β-ol-3,17-dione and the 11-p-toluenesulfonic acid ester thereof; 9α-bromo-18-nor-D-homo-5α-13(17a)-androstene-3α,11β-diol-17-one and the 3-acetate ester thereof and 18-nor-D-homo-5β-13(17a)-androstene-3β,11β-diol-17-one.

The novel 18-nor-D-homo-13(17a)-dehydro-5α-androstanes and 5β-androstanes of Formula I are valuable therapeutic agents in that they are anti-androgenic agents. They are thus useful in the treatment of acne or in the alleviation of ailments such as enlargement of the prostate gland. While all the 18-nor-D-homo-13(17a)-dehydro-androstanes of Formula I are valuable anti-androgenic agents, the preferred species are the 18-nor-D-homo-5α-13(17a)-androstenes and particularly 18-nor-D-homo-5α-13(17a)-androstene-3β,11β-diol - 17 - one and esters thereof.

The 18-nor-D-homo steroids of our invention are conveniently manufactured by first preparing an 11-nitrite ester of an 11β-hydroxy-17-keto-5α- (or 5β)-androstane which is saturated in the A-ring; and then subjecting the 11β-nitrite-17-keto-5α- (or 5β)-androstane to ultraviolet radiation which possesses a band of radiation corresponding to at least some of the absorption bands of the nitrite radical; and isolating the 11β-hydroxy-17-keto-18-nor-D-homo-5α-13(17a)-dehydroandrostene or 17β-hydroxy-17-keto - 18-nor-D-homo-5β-13(17a) - dehydroandrostane thereby produced.

The 11β-acyloxy esters of Formula I, e.g., the 11β-acetate, 11β-methanesulfonate, and the 11β-benzoate, are then conveniently prepared from the corresponding 11β-hydroxy-18-nor-D-homo-androstanes thus produced and isolated, by utilizing conventional techniques such as reaction with an acid anhydride (e.g., acetic anhydride) or an acid halide (e.g., methanesulfonylchloride or benzoyl chloride) in pyridine.

Illustrative of our process is the following reaction sequence. Reaction of 11β-hydroxy-5β-androstane-3,17-dione with nitrosyl chloride in pyridine at —30 to —10° C. readily gives 11β-hydroxy-5β-androstane-3,17-dione 11-nitrite. The latter is irradiated with a Pyrex filtered 200 watt ultraviolet lamp, in a stream of nitrogen, in toluene at about 40° C. for about one hour. The solution is filtered from some insoluble material, concentrated and the product crystallized to give 11β-hydroxy-18-nor-D-homo-5β-13(17a)-androstene-3,17-dione, which may be reacted with acetic anhydride in pyridine to give the corresponding 11-acylate, i.e., 11β-acetoxy-18-nor-D-homo-5β-13(17a)-androstene-3,17-dione.

It is thus apparent that the necessary intermediates in our process are 11-nitrite esters of androstanes of the following structural Formula II:

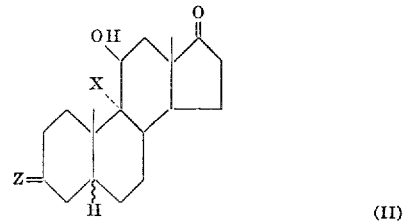

(II)

wherein X is a member of the group consisting of H and halogen, and Z is a member of the group consisting of keto; (H,βOR') and (H,αOR') wherein R' is a member of the group consisting of H and an acyl radical of a carboxylic acid having up to 12 carbon atoms.

The 11-nitrite-17-keto-5α-androstane and 11-nitrite-17-keto-5β-androstane intermediates of our process are prepared by reacting a solution of the corresponding 11β-hydroxy-17-keto steroid in pyridine, dimethylformamide, ethyl acetate, or other non-polar solvent with a nitrosyl halide, preferably nitrosyl chloride. The nitrosyl chloride or bromide used may be added to the 11β-hydroxy steroid solution in the same solvent as that used to dissolve the 11β-hydroxy steroid, or alternatively, it may be introduced as a gas into the steroidal alcohol solution. The formation of the 11β-nitrite ester is usually rapid and generally complete within ½ hour. Nitrosyl chloride is added until there is a color change to orange-brown or other color which persists, at which time it can be assumed that the 11β-nitrite has formed and the compound in solution is ready for separation and photolysis. The temperature at which the nitrite formation reactions are carried out range from usually −30° C. to +30° C. In general, when nitrosyl chloride is the reactant used, the reaction temperature is usually in the neighborhood from −20° C. to +10° C., and preferably at −15° C. to −5° C.

After completion of the formation of the 11β-nitrite ester, the nitrite is separated usually by adding water to the solution to precipitate the nitrite and by subsequent filtering followed by crystallization and recrystallization, if desired.

When preparing the 11-nitrite ester intermediates it is preferable to protect any free hydroxyl groups elsewhere in the molecule. Thus, for example, prior to reaction with nitrosyl chloride and subsequent irradiation, the 3-monoesters of 5α-androstane-3β,11β-diol-17-one, 5β-androstane-3β,11β-diol-17-one, 5α-androstane-3α,11β-diol-17-one, and 5β-androstane-3α,11β-diol-17-one, e.g., the benzoate or acetate, are prepared by standard methods such as reaction of the corresponding 3-hydroxy compound with an acid chloride or acid anhydride, e.g. benzoylchloride and acetic anhydride. Removal of the protective ester grouping is effected preferably after irradiation of the 11-nitrite-17-keto steroid and isolation of the novel 11-hydroxy-17-keto-18-nor-D-homo-13(17a)-dehydro steroid thereby produced. Hydrolysis may be effected chemically by mild alkaline hydrolysis such as with methanolic sodium carbonate or, in the case of the acetate esters, by microbiological methods such as with *Flavobacterium dehydrogenans* (Rutgers Collection No. 130), utilizing procedures similar to those described in South African Patent No. 3,462/55. Thus, 5β-androstane-3β,11β-diol-17-one upon reaction with acetic anhydride and pyridine is converted to the corresponding 3-acetate ester which is reacted with nitrosyl chloride in pyridine as described herein to give 5β-androstane-3β,11β-diol-17-one 3-acetate 11-nitrite. Irradiation with ultraviolet light of a toluene solution of the aforementioned 3-acetate 11-nitrite ester, and isolation of the 18-nor-D-homo-13(17a) - dehydrosteroid thereby formed yields 18-nor-D-homo-5β-13(17a)-androstene-3β,11β-diol-17-one 3-acetate which may be subjected to the action of *Flavobacterium dehydrogenans* to give 18-nor-D-homo-5β-13(17a)-androstene-3β,11β-diol-17-one.

When hydrolyzing via chemical techniques any ester groups present in an 18-nor-D-homo-13(17a)-dehydro-5α (or 5β)-androstane of our invention it is necessary to utilize only mild alkaline conditions if it is desired to obtain an 18-nor-D-homo-androstane of our invention possessing an 11-hydroxyl group. If hydrolysis is done under acid conditions or stronger basic conditions such as with perchloric acid or sodium hydroxide, respectively, simultaneous dehydration at C-11 will occur together with hydrolysis of any ester group present. Thus, for example, 5α-androstane-3β,11β-diol-17-one 3-acetate 11-nitrite upon photolysis according to the process described herein yields the novel 18-nor-D-homo-5α-13(17a)-androstene-3β,11β-diol-17-one 3-acetate. Hydrolysis of the aforementioned compound with sodium bicarbonate in methanol yields the corresponding 3-hydroxy compound of Formula I, whereas hydrolysis with perchloric acid or with potassium hydroxide in methanol yields the 11-dehydrosteroid, 18-nor-D-homo-5α-11,13(17a) - androstadiene-3β-ol-17-one. Our novel-11β-hydroxy-18 - nor - D-homo steroids are thus useful as intermediates in the preparation of the corresponding 11-dehydrosteroids.

The A, B, and C-ring saturated 5α- and 5β-androstane 11-nitrite esters, after preparation and isolation as described above, are dissolved in a non-reactive solvent prior to being irradiated by ultraviolet light according to our process. The solvent chosen preferably has a high degree of transparency to the ultraviolet radiation within the specified band of nitrite absorption. Solvents which may be used for the photolysis of the nitrite include acetic acid, acetone, acetonitrile, benzene, carbon disulfide, carbon tetrachloride, chlorobenzene, chloroform, cyclohexane, dimethylether, dimethylformamide, dioxane, ethyl acetate, Freon 113, heptane, methanol, ethanol, methylene chloride, and toluene. Of these benzene and toluene yield preferred results.

While the solvents used in the photolysis are ordinarily water-free, a small amount of moisture in the solvent used for photolysis does not ordinarily interfere with the progress of the ultraviolet activation and rearrangement of the nitrite in accordance with the present invention.

The ultraviolet radiation used to activate the nitrite radical is that band of radiant energy which corresponds to some or all of the ultraviolet absorption of the nitrite radical, and is from 3000 A. to 4400 A. The 11-nitrite ester thus irradiated and activated leaves the oxygen at C-11 with concomitant abstraction of a hydrogen on the 18-carbon by the resulting 11-alkoxy group, together with splitting of the D-ring between C-13 and C-17 and ring reclosure resulting in a bond between original C-18 and C-17 (new C-17a and 17).

Radiant energy containing ultraviolet light in the range of 3000 to 4400 A. is conveniently supplied by a Hanovia high pressure mercury arc lamp with a Pyrex sleeve, while the nitrite to be reacted is contained in an ultraviolet transmitting vessel such as a water cooled Vycor-immersion well.

During the course of the photolysis of a 11β-nitrite ester of an androstane, a stream of nitrogen or other inert gas is generally bubbled through the solution (although not always necessary) to keep the nitrite solution protected by an inert atomsphere.

Our process whereby a steroidal 17-keto-11β-nitrite androstane is irradiated by ultraviolet light is usually carried out utilizing a 200 watt mercury lamp as an ultraviolet light source with the irradiated material being dissolved in benzene or toluene and kept under an atmosphere of nitrogen. The reaction is usually carried out at temperatures ranging from 10–50° C. and preferably in the range of 18–40° C.

The photolysis of the nitrite ester which is carried on by irradiation with the selected band of ultraviolet radiation is monitored from time to time by ultraviolet or infrared spectrophotometry of an aliquot, and the reaction is complete when ultraviolet or infrared absorption spectra lack the characteristic spectra of the nitrite radical.

By our process of photolyzing an 11-nitrite ester of an A-ring saturated-17-keto-5α(or 5β)-androstane, there is obtained a mixture of products (a major portion being an 18-nor-D-homo-13(17a)-dehydro-5α(or 5β) - androstane of formula I) which are separable by filtration, by partition chromatographic techniques, by fractional crystallization, or by a combinaton of these techniques.

Our novel compounds may be crystallized from organic solvents such as ethyl acetate, acetone, acetone-hexane, methylene chloride, methylene chloride-ether and the like, or are chromatographed on Florisil using eluting solvents and solvent mixtures such as hexane, ether-hexane, ether, ether-methylene chloride, methylene chloride, methylene chloride-acetone and the like. Alternatively, our novel 18-nor-D-homo-5α(or 5β)-13(17a)-androstenes may be isolated using a partition chromatographic system on Chromosorb, such as ligroin-propylene glycol, toluene-propylene glycol, and the like. When chromatographic techniques are employed, fractions are monitored by infrared and ultraviolet spectroscopy to determine the zones containing the desired 11β-hydroxy-18-nor-D-homo-5α(or 5β)-13(17a)-androstenes.

The necessary starting compounds in the process of preparing the novel 18-nor-D-homo steroids of Formula I are 11β-hydroxy-17-keto-5α-androstanes and 11β-hydroxy-17-keto-5β-androstanes of Formula II. Some of these starting compounds are known, such as 5α-androstane - 3β,11β-diol-17-one, 5α-androstane-3α,11β-diol-17-one, 5β-androstane-3α,11β-diol-17-one, and the 3-acetate esters of the foregoing.

Other 11β - hydroxy-17-keto-5α(and 5β)-androstane starting steroids may be prepared from known 11β,17α,21- trihydroxy-20-keto-5α- and 5β-pregnanes by the oxidative degradation of the C–17 side chain utilizing sodium bismuthate. Thus, 5β-pregnane-11β,17α,21-triol-3,20-dione 21-acetate is hydrolyzed to the corresponding 21-alcohol by means of potassium bicarbonate in methanol, for example, and the resulting 5β-pregnane-11β,17α,21-triol-3,20-dione is reacted with sodium bismuthate in aqueous acetic acid to yield the starting compound, 5β-androstane-11β-ol-3,17-dione. Other typical 11β,17α,21-trihydroxy-3,20-diketo-5α- and 5β-pregnanes and their 21-acetate esters which, after hydrolysis of the 21-esters, may be degraded to form the corresponding 17-keto androstanes, are 5α-androstane-11β,17α,21-triol-3,20-dione 21-acetate and the 9α-fluoro, 9α-chloro, and 9α-bromo derivatives thereof, from which are derived the starting compounds 5α-androstane-11β-ol-3,17-dione, 9α-fluoro-5α-androstane-11β-ol-3,17-dione, 9α-chloro-5α- and rostane-11β-ol-3,17-dione and 9α-bromo-5α-androstane-11β-ol-3,17-dione, respectively.

Alternatively, 11β-hydroxy-17-keto-5α(and 5β)-androstane starting compounds may be conveniently prepared from the corresponding 11-desoxy-17-keto-5α(or 5β)-androstanes by hydroxylating microbiologically at C–11 with the aid of a microorganism such as *Curvularia lunata* (N.R.R.L. 2380) using procedures analogous to those described in U.S. Patent No. 2,658,023.

Introduction of a 9α-halogen group into a 11β-hydroxy-17-keto-5α-androstane or 5β-androstane may be effected by dehydrating an 11β-hydroxy-androstane such as 5α-androstane-3β,11β-diol-17-one 3-acetate or 5β-androstane-11β-ol-3,17-dione, for example, with an alkyl or arylsulfonyl chloride (e.g., methanesulfonyl chloride) in an alkaline organic medium such as in pyridine to effect the production of the corresponding 9(11)-dehydro-intermediate, e.g., 5α-9(11)-androstene-3β-ol-17-one 3-acetate and 5β-9(11)-androstene-3,17-dione, respectively. Placement of a halogen, and preferably bromine at this point in the procedure, at the 9α-carbon position is accomplished by conventional means, such as by reacting the 9(11)-dehydrosteroid with hypobromous acid, which can be prepared in situ from the reaction of N-bromoacetamide and aqueous perchloric acid, yielding directly the corresponding 9α-bromo- 5α-androstane-3β,11β-diol-17-one 3-acetate and 9α-bromo-11β-hydroxy-5β-androstane-3,17-dione respectively. Other 9α-halogeno derivatives are obtained from 9α-bromo-11β-hydroxy steroids such as the aforementioned, by refluxing the 9α-11β-bromohydrins with mild alkali, such as sodium acetate in methanol, to form the corresponding 9β,11β-oxido derivatives, e.g., 9β,11β-oxido-5α-androstane-3β-ol-17-one 3-acetate and 9β,11β - oxido-5β-androstane-3,17-dione. These latter compounds are then reacted with hydrogen fluoride in chloroform with or without ethanol and/or tetrahydrofuran to form fluorohydrins, e.g., 9α-fluoro-11β-hydroxy-5α-androstane-3β-ol-17-one 3-acetate, and 9α-fluoro-11β-hydroxy-5β-androstane-3,17-dione. Similarly, the substitution of anhydrous hydrogen chloride for hydrogen fluoride in this reaction results in the production of the corresponding 9α-chloro- derivatives.

The 9α-halogeno compounds thus prepared may then be esterified at C–11 to the nitrite ester and irradiated with ultraviolet light within the range of 3000 to 5000 A. according to our invention to obtain the 9α-halogeno-18-nor-D-homo-17-keto-13(17a)-dehydro-steroids of this invention. For example, 9α-fluoro-11β-hydroxy-5β-androstane-3,17-dione and 9α-fluoro-11β-hydroxy-5α-androstane-3β-ol-17-one 3-acetate upon reaction with nitrosyl chloride in the manner described herein yield the corresponding 11β-nitrite esters which upon irradiation by ultraviolet light while in solution, in a non-polar solvent such as toluene or benzene, and subsequent isolation of the novel compounds of our invention yield 9α-fluoro-18-nor-D-homo-5β-13(17a)-androstene - 11β - ol - 3,17-dione, and 9α-fluoro-18-nor-D-homo-5α-13(17a)-androstene-3β,11β-diol-17-one 3-acetate respectively.

The following are examples which illustrate our invention. They are not to be construed as limiting the scope of our invention, our invention being limited by the appended claims only.

EXAMPLE 1

*18-nor-D-homo-5α-13(17a)-androstene-3β,11β-diol-17-one 3-acetate*

A. *5α-androstane-3β,11β-diol-17 - one 3 - acetate 11-nitrite.*—To a solution of 1.075 g. of 5α-androstane-3β,11β-diol-17-one 3-acetate in 10 ml. of dry pyridine chilled to −30° C. is added dropwise a chilled saturated solution of nitrosyl chloride in pyridine until a reaction mixture has a definite orange color. During the addition, the reaction solution is allowed to warm to −10° C. and is stirred at this temperature for one-half hour after the addition is complete. The reaction mixture is poured into ice water. A solid separates which is filtered, washed with water and dried to give 5α-androstane-3β,11β-diol-17-one 3-acetate 11-nitrite, M.P. 136–138° C., [α]$_D$ (chloroform) +69° λ Nujol 5.74, 5.78, 6.10, 6.21, 8.1μ.

B. *18-nor-D-homo-5α-13(17a)-androstene-3β,11β-diol-17-one-3-acetate.*—A solution of 1 g. of 5α-androstane-3β,11β-diol-17-one 3-acetate 11-nitrite in 200 ml. of toluene under a blanket of nitrogen is irradiated for one hour at 40° C. with a 200 watt mercury lamp provided with a Pyrex filter. The irradiated solution is filtered and the insoluble residue discarded. The filtrate is concentrated in vacuo to a residue which is chromatographed on Florisil, the column being eluted with an ether-hexane mixture. The fractions exhibiting ultraviolet absorption (as determined by the spot test technique) are combined and crystallized from ether to give 18-nor-D-homo-5α-13(17a) - androstene - 3β,11β-diol-17-one 3-acetate, M.P. 150–155° C.

$\lambda^{MeOH}_{max.}$ 242 mμ(ε 14,000) λNujol 2.90, 5.75, 5.99, 6.12, 8.0μ

EXAMPLE 2

*18-nor-D-homo-5β-13(17a)-androstene-3α,11β-diol-17-one 3-acetate*

A. *5β-androstane-3α,11β-diol-17-one 3-acetate 11-nitrite.*—In the manner of Example 1A, 5β-androstane-3α,11β-diol-17-one 3-acetate is reacted with nitrosyl chloride in pyridine and the resultant product isolated and dried to give 5β-androstane-3α,11β-diol-17-one 3-acetate 11-nitrite.

B. *18-nor-D-homo-5β-13(17a)-androstene-3α,11β-diol-17-one 3-acetate.*—In the manner described in Example 1B, 5β-androstane-3α,11β-diol-17-one 3-acetate 11-nitrite in toluene is irradiated with a 200 watt mercury lamp and the resultant product isolated and purified to give 18-nor-D-homo-5β-13(17a)-androstene-3α,11β-diol-17-one 3-acetate.

EXAMPLE 3

*18-nor-D-homo-5β-13(17a)-androstene-11β-ol-3,17-dione*

A. *5β-pregnane-11β,17α,21-triol-3,20-dione.*—A mixture of 5β-pregnane-11β,17α,21-triol-3,20-dione 21-acetate and 1.1 equivalents of potassium bicarbonate in aqueous methanol is refluxed under nitrogen for 30 minutes, concentrated in vacuo to about half the original total volume, then diluted with water. The resultant precipitate is filtered and dried to give 5β-pregnane-11β,17α,21-triol-3,20-dione.

B. *5β-Androstane-11β-ol-3,17-dione.*—To a solution of 5 g. of 5β-pregnane-11β,17α,21-triol-3,20-dione in 300 ml. of 50 percent aqueous acetic acid is added 25 g. of sodium bismuthate and the mixture is stirred for 30 minutes at 90 to 100° C. The reaction mixture is filtered and the filtrate diluted with water and extracted wtih methylene chloride. The organic extracts are combined and concentrated to a volume of about 15 ml. The concentrated solution is then filtered through a column of Florisil, eluting with ether. The eluates are combined and concentrated to a residue to give 5β-androstane-11β-ol-3,17-dione.

C. *5β-androstane-11β-ol-3,17-dione 11-nitrite.* — In a manner similar to that described in Example 1A, 5β-androstane-11β-ol-3,17-dione is reacted with nitrosyl chloride in pyridine and the resultant product isolated to give 5β-androstane-11β-ol-3,17-dione 11-nitrite.

D. *18-nor-D-homo-5β-13(17a)-androstene-11β-ol-3,17-dione.*—In a manner similar to that described in Example 1B, 5β-androstane-11β-ol-3,17-dione 11-nitrite is irradiated with a 200 watt mercury lamp and the resultant product isolated and purified to give 18-nor-D-homo-5β-13(17a)-androstene-11β-ol-3,17-dione.

EXAMPLE 4

*18-nor-D-homo - 5α-13(17a) - pregnene-11β-ol-3,17-dione and 9α-halogeno-18-nor-D-homo-5α-13(17a)-pregnene-11β-ol-3,17-dione*

A. *5α-androstane-11β-ol-3,17-dione and 9α - halogeno-5α-androstane-11β-ol-3,17-dione.* — 5α-pregnane-11β,17α,21-triol-3,20-dione 21-acetate, 9α-fluoro-5α-pregnane-11β,17α,21-triol-3,20-dione 21-acetate, 9α-chloro-5α-pregnane-11β,17α,21-triol-3,20-dione 21-acetate, and 9α-bromo-5α-pregnane-11β,17α,21-triol-3,20-dione 21-acetate are each reacted with 1.1 equivalents of potassium bicarbonate in aqueous methanol in the manner described in Example 3A and each of the resultant products isolated to give respectively, 5α-pregnane-11β,17α,21-triol-3,20-dione, 9α-fluoro-5α-pregnane-11β,17α,21-triol-3,20-dione, 9α - chloro - 5α-pregnane-11β,17α,21-triol-3,20-dione, and 9α - bromo - 5α-pregnane-11β,17α,21-triol-3,20-dione.

Utilizing the procedure similar to that described in Example 3B, 5α-pregnane-11β-17α-21-triol-3,20-dione, 9α-fluoro-5α-pregnane-11β,17α,21-triol-3,20-dione, 9α-chloro-5α-pregnane-11β,17α,21-triol-3,20-dione, and 9α-bromo-5α-pregnane-11β,17α-21-triol-3,20-dione, are each reacted with sodium bismuthate in aqueous acetic acid and each resultant product isolated and purified to give respectively, 5α-androstane-11β-ol-3,17-dione, 9α-fluoro-5α-androstane-11β-ol-3,17-dione, 9α-chloro-5α-androstane-11β - ol - 3,17-dione, and 9α-bromo-5α-androstane-11β-ol-3,17-dione.

B. *5α-androstane-11β-ol-3,17-dione 11-nitrite and 9α-halogeno-5α-androstane-11β-ol-3,17-dione.*—In the manner described in Example 1A, 5α-androstane-11β-ol-3,17-dione is reacted with nitrosyl chloride in pyridine to give 5α-androstane-11β-ol-3,17-dione 11-nitrite.

In a similar manner, 9α-fluoro-5α-androstane-11β-ol-3,17-dione, 9α-chloro-5α-androstane-11β-ol - 3,17 - dione, and 9α-bromo-5α-androstane-11β-ol-3,17-dione are each reacted with nitrosyl chloride to give respectively 9α-fluoro-5α-androstane-11β-ol-3,17-dione 11 - nitrite, 9α-chloro-5α-androstane-11β-ol-3,17-dione 11-nitrite, and 9α-bromo-5α-androstane-11β-ol-3,17-dione 11-nitrite.

C. *18-nor-D-homo-5α-13(17a)-androstene-11β-ol-3,17-dione and 9α-halogeno-18-nor-D-homo-5α-13(17a)-androstene - 11β-ol-3,17-dione.* — 5α - androstane - 11β-ol-3,17-dione 11-nitrite in toluene is irradiated with a 200 watt mercury lamp in the manner of Example 1B. The resultant product is isolated and purified to give 18-nor-D-homo-5α-13(17a)-androstene-11β-ol-3,17-dione.

Similarly, 9α-fluoro-5α-androstane-11β-ol - 3,17 - dione 11-nitrite, 9α-chloro-5α-androstane-11β-ol-3,17-dione 11-nitrite, and 9α-bromo-5α-androstane-11β-ol-3,17-dione 11-nitrite, are each irradiated with a 200 watt mercury lamp while in a toluene solution and the resultant product isolated to give respectively 9α-fluoro-18-nor-D-homo-5α-13(17a)-androstene-11β-ol-3,17-dione, 9α-chloro-18-nor-D-homo-5α-13(17a)-androstene-11β - ol - 3,17-dione, and 9α-bromo-18-nor-D-homo-5α-13(17a)-androstene-11β-ol-3,17-dione.

EXAMPLE 5

*3-oxygenated-9α-halogeno-11β-hydroxy-17-keto 5α- and 5β-androstanes*

A. *3-oxygenated-17-keto-9(11)-dehydro-5α- and 5β-androstanes.*—A solution of 5 g. of 5α-androstane-3β,11β-diol-17-one 3-acetate in 100 ml. of pyridine is chilled to 0° C. and a solution of 10 ml. of methanesulfonyl chloride in 20 ml. of chloroform is added dropwise. The mixture is allowed to stand in the ice box for 100 hours, then a little ice is added and the solution diluted with chloroform. The organic solution is washed with water, 5 percent hydrochloric acid, 5 percent aqueous sodium bicarbonate, and again with water. The solution is dried over magnesium sulfate, filtered and concentrated in vacuo to a residue which is crystallized twice from acetone-hexane to give 5α-9(11)-androstene-3β-ol-17-one 3-acetate.

In a similar manner 5β-androstane-3α,11β-ol-17-one 3-acetate and 5β-androstane-11β-diol-3,17-dione are each reacted with methanesulfonyl chloride in pyridine and the resultant product isolated and purified to give respectively 5β-9(11)-androstene-3α-ol-17-one 3-acetate and 5β-9(11)-androstene-3,17-dione.

B. *3-oxygenaed-9α-bromo-11β-hydroxy-17-keto-5α- and 5β-androstanes.*—To a solution of 0.150 g. of 5α-9(11)-androstene-3β-ol-17-one 3-acetate in 20 ml. of dioxane (which has been purified by refluxing over sodium followed by distillation) and 2 ml. of water is added 0.07 g. of N-bromoacetamide and 1 ml. of 1.5 N perchloric acid. The mixture is allowed to stand for 2 hours, then a solution of 0.2 g. of sodium sulfite in 2 ml. of water is added and the mixture is extracted with methylene chloride. The organic extracts are combined, washed with water, dried over magnesium sulfate and evaporated to a residue which is crystallized from acetone to give 9α-bromo-5α-androstane-3β,11β-diol-17-one 3-acetate.

In a similar manner 5β-9(11)-androstene-3α-ol-17-one 3-acetate and 5β-9(11)-androstene-3,17-dione are each reacted with N-bromoacetamide and perchloric acid to yield respectively, 9α-bromo-5β-androstane-3α,11β-diol-17-one 3-acetate and 9α-bromo-5β-androstane-11β-ol-3,17-dione.

C. *3-oxygenated-9β,11β-oxido-17-keto-5α- and 5β-androstanes.*—To 0.5 g. of 9α-bromo-5α-androstane-3β,11β-diol-17-one 3-acetate in 30 ml. of acetone is added 3 g. of potassium acetate. The reaction mixture is refluxed for 6 hours, then the acetone is distilled and water is added to the resultant residue. A solid separates which is filtered and crystallized from methanol-water to give 5α-androstane-9β,11β-oxido-3β-ol-17-one 3-acetate.

In a similar manner 9α-bromo-5β-androstane-3α,11β-diol-17-one 3-acetate and 9α-bromo-5β-androstane-11β-ol-3,17-dione are each reacted with potassium acetate in acetone to give, respectively, 9β,11β-oxido-5β-androstane-3α-ol-17-one 3-acetate and 9β,11β-oxido-5β-androstane-3,17-dione.

D. *3-oxygenated-9α - fluoro - 11β - hydroxy-17-keto-5α- and 5β-androstanes.*—To 3.5 g. of hydrogen fluoride in 20 ml. of chloroform and 0.6 ml. of tetrahydrofuran at —10° C. is added 1.0 g. of 9β,11β-oxido-5α-androstane-3β-ol-17-one 3-acetate. The reaction mixture is kept at —10° C. for 3 hours, then poured into aqueous sodium carbonate solution. The organic solvent layer is separated from the water and evaporated to a residue which is crystallized from methanol to give 9α-fluoro-5α-androstane-3β,11β-diol-17-one 3-acetate.

In a similar manner, 9β,11β-oxido-5β-androstane-3α-ol-17-one 3-acetate and 9β,11β-oxido-5β-androstane-3,17-dione are each reacted with hydrogen fluoride in chloroform and tetrahydrofuran to give, respectively, 9α-fluoro-5β-androstane-3α,11β-diol-17-one 3-acetate and 9α-fluoro-5β-androstane-11β-ol-3,17-dione.

E. *3-oxygenated-9α - chloro - 11β-hydroxy-17-keto-5α- and 5β-androstanes.*—A solution of 1.0 g. of 9β,11β-oxido-5α-androstane-3β-ol-17-one 3-acetate in 30 ml. of alcohol-free chloroform is saturated at 0° C. with anhydrous hydrogen chloride and the mixture allowed to stand at 0° C. for 6 hours. The solvent is distilled in vacuo from the reaction mixture leaving a residue which is crystallized from acetone to give 9α-chloro-5α-andrstane-3β,11β-diol-17-one 3-acetate.

In a similar manner, 9β,11β-oxido-5β-androstane-3α-ol-17-one 3-acetate and 9β,11β-oxido-5β-androstane-3,17-dione are each reacted with hydrogen chloride in chloroform to give respectively 9α-chloro-5β-androstane-3α,11β-diol-17-one 3-acetate and 9α-chloro-5β-androstane-11β-ol-3,17-dione.

EXAMPLE 6

*3-oxygenated-9α-halogeno-11β-hydroxy-17-keto-18-nor-D-homo-13(17a)-dehydro-5α- and 5β-androstanes*

A. *11-nitrite esters of 3-oxygenated-9α-halogeno-11β-hydroxy-17-keto-5α- and 5β-androstanes.*—In the manner described in Example 1A, 9α-fluoro-5α-androstane-3β,11β-diol-17-one 3-acetate (prepared as described in Example 5D) is reacted with nitrosyl chloride in pyridine and the resultant product isolated to give 9α-fluoro-5α-androstane-3β,11β-diol-17-one 3-acetate 11-nitrite.

In a similar manner, 9α-fluoro-5β-androstane-3α,11β-diol-17-one 3-acetate, 9α - fluoro - 5β - androstane-11β-ol-3,17-dione, 9α-bromo-5α-androstane-3β,11β - diol - 17-one 3-acetate, 9α-bromo-5β-androstane-3α,11β-diol-17-one 3-acetate, 9α-bromo-5β-androstane-11β - ol - 3,17-dione, 9α-chloro-5α-androstane-3β,11β - diol - 17 - one 3-acetate, 9α-chloro-5β-androstane-3α,11β-diol-17-one 3-acetate and 9α-chloro-5β-androstane-11β-ol-3,17-dione are each reacted with nitrosyl chloride in pyridine to give respectively 9α-fluoro-5β-androstane-3α,11β-diol-17-one 3-acetate 11-nitrite, 9α-fluoro-5β-androstane-11β-ol-3,17-dione 11-nitrite, 9α-bromo-5α-androstane-3β,11β-diol-17-one 3-acetate 11-nitrite, 9α-bromo-5β-androstane-3α,11β - diol - 17 - one 3-acetate 11-nitrite, 9α-bromo - 5β - androstane-11β-ol-3,17-dione 11-nitrite, 9α-chloro-5α-androstane-3β,11β-diol-17-one 3-acetate 11-nitrite, 9α-chloro-5β-androstane-3α,11β-diol-17-one 3-acetate 11-nitrite and 9α-chloro-5β-androstane-11β-ol-3,17-dione 11-nitrite.

B. *3-oxygenated-9α - halogeno - 11β - hydroxy-17-keto-13(17a)-dehydro-5α- and 5β-androstanes.*—In a manner similar to that described in Example 1B 9α-fluoro-5α-androstane-3β,11β-diol-17-one 3-acetate 11-nitrite in toluene is irradiated with a 200 watt mercury lamp and the resultant product isolated and purified to give 9α-fluoro-18-nor-D-homo-5α-13(17a)-androstene-3β,11β-diol-17-one 3-acetate.

In a similar manner, 9α-fluoro-5β-androstane-3α,11β-diol-17-one 3-acetate 11-nitrite, 9α-fluoro-5β-androstane-11β-ol-3,17-dione 11-nitrite, 9α-bromo-5α-androstane-3β,11β-diol-17-one 3-acetate 11-nitrite, 9α-bromo-5β-androstane-3α,11β-diol-17-one 3-acetate 11-nitrite, 9α-bromo-5β-androstane-11β-ol-3,17-dione 11 nitrite, 9α-chloro-5α-androstane-3β,11β-diol-17-one 3-acetate 11-nitrite, 9α - chloro - 5β-androstane - 3α,11β - diol - 17 - one 3-acetate 11-nitrite, and 9α-chloro-5β-androstane-11β-ol-3,17-dione 11-nitrite each in toluene solution are irradiated with a 200-watt mercury lamp and the resultant products isolated and purified to give respectively, 9α-fluoro-18-nor-D-homo-5β-13(17a) - androstene - 3α,11β-diol-17-one 3-acetate, 9α-fluoro - 18 - nor - D - homo - 5β-13(17a)-androstene - 11β - ol - 3,17-dione, 9α-bromo-18-nor-D-homo-5α-13(17a)-androstene-3β,11β - diol - 17-one 3-acetate, 9α-bromo-18-nor-D-homo - 5β - 13(17a)-androstene-3α,11β-diol-17-one 3-acetate, 9α-bromo-18-nor-D-homo-5β-13(17a) - androstene - 11β - ol - 3,17-dione, 9α-chloro-18-nor-D-homo - 5α - 13(17a) - androstene-3β,11β-diol-17-one 3-acetate, 9α-chloro - 18 - nor-D - homo - 5β-13(17a)-androstene-3α,11β - diol - 17 - one 3-acetate, and 9α-chloro-18-nor-D-homo-5β-13(17a) - androstene - 11β-ol-3,17-dione.

EXAMPLE 7

*3α-acetoxy-9α-halogeno-11β-hydroxy-17-keto-5α-androstane*

A. *5α-9(11)-androstene-3α - ol - 17 - one 3-acetate.*—In the manner described in Example 5A, 5α-androstane-3α,11β-diol-17-one 3-acetate is reacted with methanesulfonyl chloride in pyridine and the resultant product is isolated and purified to give 5α-9(11)-androstene-3α-ol-17-one 3-acetate.

B. *9α-bromo-5α-androstane-3α,11β-diol-17 - one 3-acetate.*—In a manner similar to that described in Example 5B, 5α-9(11)-androstene-3α-ol-17-one 3-acetate is reacted with N-bromoacetamide and perchloric acid and the resultant product isolated and purified to give 9α-bromo-5α-androstane-3α-11β-diol-17-one 3-acetate.

C. *9β,11β-oxido-5α-androstane-3α - ol - 17 - one 3-acetate.*—In a manner similar to that described in Example 5C 9α-bromo-5α-androstane-3α,11β-diol-17-one 3-acetate is reacted with potassium acetate in acetone and the resultant product is isolated and purified to give 9β,11β-oxido-5α-androstane-3α-ol-17-one 3-acetate.

D. *9α-fluoro-5α-androstane-3α,11β-diol-17 - one 3-acetate.*—In the manner described in Example 5D, 9β,11β-oxido-5α-androstane-3α-ol-17-one 3-acetate is reacted with hydrogen fluoride in chloroform and tetrahydrofuran and the resultant product isolated and purified to give 9α-fluoro-5α-androstane-3α,11β-diol-17-one 3-acetate.

E. *9α-chloro-5α-androstane-3α,11β-diol-17 - one 3-acetate.*—In a manner similar to that described in Example 5E 9β,11β-oxido-5α-androstane-3α-ol-17-one 3-acetate is reacted with anhydrous hydrogen chloride and the resultant product isolated and purified to give 9α-chloro-5α-androstane-3α,11β-diol-17-one 3-acetate.

EXAMPLE 8

*18-nor-D-homo-5α-13(17a)-androstene-3α,11β-diol-17-one 3-acetate*

In a manner described in Example 1A 5α-androstane-3α,11β-diol-17-one 3-acetate is reacted with nitrosyl chloride in pyridine and the resultant product isolated and purified to give 5α-androstane-3α,11β-diol-17-one 3-acetate 11-nitrite.

In a manner similar to that described in Example 1B 5α-androstane-3α,11β-diol-17-one 3-acetate 11-nitrite in toluene solution is irradiated with a 200-watt mercury lamp and the resultant product isolated and purified to give 18-nor-D-homo-5α,13(17a)-androstene - 3α,11β-diol-17-one 3 acetate.

EXAMPLE 9

*9α-halogeno-18-nor-D-homo-5α-13(17a)-androstene 3α,11β-diol-17-one 3-acetate*

9α-fluoro-5α-androstane-3α-11β-diol-17-one 3-acetate is reacted with nitrosyl chloride in pyridine in a manner similar to that described in Example 1A and the resultant product isolated to give 9α-fluoro-5α-androstane-3α,11β-diol-17-one 3-acetate 11-nitrite.

In a manner similar to that described in Example 1B 9α-fluoro-5α-androstane-3α,11β-diol-17-one 3-acetate 11-nitrite in toluene solution is irradiated with a Pyrex filtered 200-watt mercury lamp and the resultant product isolated and purified to give 9α-fluoro-18-nor-D-homo-5A-13(17a)-androstene-3α-11β-diol-17-one 3-acetate.

Similarly by following the same procedures described above 9α-chloro-5α-androstane-3α,11β-diol-17-one 3-acetate and 9α-bromo-5α-androstane - 3α,11β - diol - 17 - one 3-acetate are each reacted with nitrosyl chloride in pyridine to give respectively 9α-chloro-5α-androstane-3α,11β-diol-17-one 3-acetate 11-nitrite and 9α-bromo-5α-androstane-3α,11β-diol-17-one 3-acetate 11-nitrite which upon irradiation in toluene solution with a 200-watt mercury lamp yield products which are isolated and purified to give respectively 9α-chloro-18-nor-D-homo-5α-13(17a)-androstene 3α,11β-diol-17-one 3-acetate and 9α-bromo-18-nor-D-homo-5α-13(17a) - androstene - 3α,11β-diol-17-one 3-acetate.

EXAMPLE 10

*5β-androstane-3β,11β-diol-17-one 3-acetate and the 9α-halogeno derivatives thereof*

A. *5β-androstane-3β,11β-diol-17-one.*—To a stirred suspension of 2 g. of lithium aluminum hydride in 200 ml. of anhydrous tetrahydrofuran chilled in an ice bath is added dropwise a solution of 5 g. of 4-pregnene-11β,17α,21-triol-3,20-dione in 250 ml. of tetrahydrofuran. When the addition is complete, the ice bath is removed and the mixture is heated at reflux temperature with stirring for 2 hours. The reaction mixture is then chilled in an ice bath and a solution of 50 ml. of ethyl acetate in 100 ml. of tetrahydrofuran is added slowly, followed by the dropwise addition of a saturated aqueous solution of sodium sulfate. The organic layer is separated from the aqueous layer then filtered and concentrated in vacuo to a residue of 4-pregnene-3,11β,17α,20,21-pentol containing predominantly the 3β-hydroxy isomer.

The total reaction product, 4-pregnene-3,11β,17α,20,21-pentol, obtained as described above, is dissolved in 500 ml. of ethyl acetate, then 10 ml. of acetic acid is added and the mixture is reduced with hydrogen at atmospheric pressure utilizing 1 g. of platinum oxide as catalyst. When the hydrogen uptake ceases, the catalyst is filtered off and the solution concentrated in vacuo to a residue of a mixture of 5β-pregnane-3β-11β,17α,20,21-pentol and 5α-pregnane-3β,11β,17α,20,21-pentol and the 3α-hydroxy isomers thereof.

The total reaction mixture of 5-pregnane-3,11β,17α,20,21-pentol obtained in the manner described above, is dissolved in 200 ml. of hot 50 percent aqueous acetic acid, 25 g. of sodium bismuthate is added and the mixture is heated with vigorous stirring on the steam bath for one hour. The mixture is filtered and the filtrate poured into water, the product is extracted with methylene chloride. The organic extracts are combined, washed with water, with aqueous sodium carbonate and again with water, dried over sodium sulfate then filtered through a column of Florisil with methylene chloride. The methylene chloride eluate is concentrated to a residue which is chromatographed on a partition column using toluene-propylene glycol on 500 g. of Chromosorb. Those fractions containing 5α-androstane-3α,11β-diol-17-one, 5α-androstane-3β,11β-diol-17-one, and 5β-androstane-3α,11β-diol-17-one (as indicated by paper chromatography) are discarded. The remaining fractions are subjected to infrared analysis and those possessing a hydroxy group and a 5-membered ring ketone are combined and crystallized from acetone-hexane to give 5β-androstane-3β,11β-diol-17-one.

B. *5β - androstane - 3β,11β - diol - 17 - one 3-acetate.*—To a solution of 100 mg. of 5β-androstane-3β,11β-diol-17-one in 2 ml. of pyridine is added 100 mg. of acetic anhydride. The reaction mixture is allowed to stand at room temperature overnight and poured into cold dilute hydrochloric acid with stirring. The aqueous mixture is stirred for 15 minutes and the resultant solution filtered and crystallized from aqueous methanol to give 5β-androstane-3β,11β-diol-17-one 3-acetate.

C. *9α - bromo - 5β - androstane - 3β,11β - diol - 17 - one 3-acetate.*—In a manner similar to that described in Example 5A 5β-androstane-3β,11β-diol-17-one 3-acetate in pyridine is reacted with methanesulfonyl chloride in chloroform and the resultant product isolated and purified to give 5β-9(11)-androstene-3β-ol-17-one 3-acetate.

In a manner similar to that described in Example 5B 5β-9(11)-androstene-3β-ol-17-one 3-acetate in dioxane is reacted with N-bromoacetamide and perchloric acid. The resultant product is isolated and purified in the described manner to give 9α-bromo-5β-androstane-3β,11β-diol-17-one 3-acetate.

D. *9α-fluoro - 5β - androstane - 3β,11β - diol - 17 - one 3-acetate.*—In a manner similar to that described in Example 5C 9α-bromo-5β-androstane-3β,11β-diol-17-one 3-acetate in acetone is reacted with potassium acetate and the resultant product isolated and purified to give 9β,11β-oxido-5β-androstane-3β-ol-17-one 3-acetate.

In a manner similar to that described in Example 5D 9β,11β-oxido-5β-androstane-3β-ol-17-one 3-acetate is reacted with hydrogen fluoride in chloroform-tetrahydrofuran and the resultant product isolated and purified to give 9α-fluoro-5β-androstane-3β,11β-diol-17-one 3-acetate.

E. *9α - chloro - 5β - androstane - 3β,11β - diol - 17 - one 3-acetate.*—In a manner similar to that described in Example 5E 9β,11β-oxido-5β-androstane-3β-ol-17-one 3-acetate is reacted with anhydrous hydrogen chloride in chloroform and the resultant product isolated and purified to give 9α-chloro-5β-androstane-3β,11β-diol-17-one 3-acetate.

EXAMPLE 11

*18-nor-D-homo-5β-13(17a)-androstene-3β,11β-diol-17-one 3-acetate and the 9α-halogeno derivatives thereof*

In a manner described in Example 1A 5β-androstane-3β,11β-diol-17-one is reacted with nitrosyl chloride in pyridine and the resultant product isolated and purified to give 5β-androstene-3β,11β-diol-17-one 3-acetate 11-nitrite.

In the manner described in Example 1B 5β-androstane-3β,11β-diol-17-one 3-acetate 11-nitrite in toluene under a blanket of nitrogen is irradiated with a 200 watt mercury lamp and the resultant product isolated and purified to give 18-nor-D-homo-5β-13(17a)-androstene-3β,11β-diol-17-one 3-acetate.

By following the procedure outlined above in this example 9α-fluoro-5β-androstane-3β,11β-diol-17-one 3-acetate, 9α-bromo-5β-androstane-3β,11β-diol-17-one 3-acetate and 9α-chloro-5β-androstane-3β,11β-diol-17-one 3-acetate are each reacted with nitrosyl chloride to give respectively, 9α-fluoro-5β-androstane-3β,11β-diol-17-one 3-acetate 11-nitrite, 9α-bromo-5β-androstane-3β,11β-diol-17-one 3-acetate 11-nitrite, and 9α-chloro-5β-androstane-3β,11β-diol-17-one 3-acetate 11-nitrite which are then irradiated with a 200 watt mercury lamp while in a toluene solution to give respectively 9α-fluoro-18-nor-D-homo-5β-13(17a)-androstene-3β,11β-diol-17-one 3-acetate, 9α-bromo-18-nor-D-homo-5β-13(17a)-androstene-3β,11β-diol-17-one 3-acetate and 9α-chloro-18-nor-D-homo-5β-13(17a)-androstene-3β,11β-diol-17-one 3-acetate.

EXAMPLE 12

*Hydrolysis of the 3-acetate esters of 18-nor-D-homo-13(17a)-androstenes to the corresponding 3-hydroxy derivatives*

A. 18 - nor - D - homo - 5α - 13(17a) - androstene-3β,11β-diol-17-one 3-acetate (the compound of Example 1) is subjected to the action of a culture of *Flavobacterium dehydrogenans* (Rutgers Collection No. 130) as follows:

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | Gm. |
|---|---|
| Yeast extract (Difco) | 10 |
| Potassium phosphate monobasic | 4.43 |
| Sodium phosphate dibasic | 4.68 |
| Tap water, to 1 liter. | |

This culture medium has previously been autoclaved, at 15 lb. pressure, for twenty minutes to obtain aseptic conditions, and cooled. The variant is grown in the medium under constant illumination, using the visible range of the spectrum. The incubation temperture is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 18-nor-D-homo-5α-13(17a)-androstene-3β,11β-diol-17-one 3-acetate dissolved in a minimum volume of ethanol. The reaction mixtures are then shaken at 30° C. for 12 to 72 hours. The reaction is stopped when paper chromatography indicates that there is no more starting material.

The contents of the flasks are combined and extracted with methylene chloride. The extracts are concentrated and the residue is crystallized from acetone-hexane yielding 18-nor-D-homo-5α-13(17a) - androstene-3β,11β-diol-17-one.

B. In a similar manner, 9α-chloro-18-nor-D-homo-5α-13(17a)-androstene - 3β,11β - diol-17-one 3-acetate, 9α-bromo - 18 - nor-D-homo-5α-13(17a)-androstene-3β,11β-diol-17-one 3-acetate, 9α-fluoro - 18 - nor-D-homo-5α-13-(17a)-androstene-3β,11β-diol-17-one 3-acetate (prepared as in Example 6), 18-nor-D-homo-5β-13(17a)-androstene-3α,11β-diol-17-one 3-acetate (compound of Example 2) and the 9α-chloro-, 9α-bromo-, and 9α-fluoro-derivatives thereof (prepared as described in Example 6), 18-nor-D-homo-5α-13(17a)-androstene-3α,11β-diol-17-one 3-acetate (compound of Example 8) and the 9α-chloro-, 9α-bromo-, and 9α-fluoro- derivatives thereof (prepared as in Example 9), 18-nor-D-homo-5β-13(17a)-androstene-3β,11β-diol-17-one 3-acetate and the 9α-chloro-, 9α-bromo-, and 9α-fluoro- derivatives thereof (prepared as in Example 11) are each subjected to the action of a culture of Flavobacterium dehydrogenans and the resultant products isolated and purified to give respectively 9α-chloro - 18 - nor-D-homo-5α-13(17a)-androstene-3β,11β-diol-17-one, 9α-bromo-18-nor-D-homo-5α-13(17a)-androstene-3β,11β-diol - 17 - one, 9α-fluoro-18-nor-D-homo-5α-13(17a) - androstene-3β,11β-diol-17-one, 18-nor-D-homo-5β-13(17a)-androstene-3α,11β-diol-17-one, 9α-chloro-18-nor-D-homo-5β-13(17a) - androstene-3α,11β-diol-17-one, 9α - bromo - 18 - nor-D-homo-5β-13(17a)-androstene-3α,11β-diol - 17 - one, 9α-fluoro-18-nor-D-homo-5β-13(17a)-androstene-3α,11β-diol - 17 - one, 18-nor-D-homo-5α-13-(17a) - androstene-3α,11β-diol-17-one, 9α-chloro-18-nor-D-homo-5α-13(17a) - androstene-3α,11β-diol-17-one, 9α-bromo - 18 - nor-D-homo-5α-13(17a)-androstene-3α,11β-diol-17-one, 9α-fluoro-18-nor-D-homo-5α-13(17a)-androstene-3α,11β-diol - 17 - one, 18-nor-D-homo-5β-13(17a)-androstene-3β,11β-diol-17-one, 9α-chloro-18-nor-D-homo-5β-13(17a)-androstene-3β,11β-diol-17-one, 9α-bromo-18-nor - D - homo-5β-13(17a)-androstene-3β,11β-diol-17-one and 9α-fluoro-18-nor-D-homo-5β-13(17a)-androstene-3β,11β-diol-17-one.

EXAMPLE 13

*Preparation of 11-esters of 18-nor-D-homo-13(17a)-androstene-3,17-diones*

A. *18 - nor - D - homo-5α-13(17a)-androstene-11β-ol-3,17-dione 11-acetate.*—To a solution of 100 mg. of 18-nor - D - homo-5α-13(17a)-androstene-11β-ol-3,17-dione (the compound of Example 4) in 2 ml. of pyridine is added 100 mg. of acetic anhydride. The reaction mixture is allowed to stand at room temperature overnight then is poured into cold dilute hydrochloric acid with stirring. The aqueous mixture is stirred for 15 minutes and the resultant solid is filtered and crystallized from aqueous methanol to give 18-nor-D-homo-13(17a)-androstene-11β-ol-3,17-dione 11-acetate.

B. In a similar fashion, 9α-fluoro-18-nor-D-homo-5α-13(17a) - androstene-11β-ol-3,17-dione, 9α-chloro-18-nor-D-homo - 5α - 13(17a)-androstene-11β-ol-3,17-dione and 9α-bromo - 18 - nor-D-homo-5α-13(17a)-androstene-11β-ol-3,17-dione are each reacted with acetic anhydride in pyridine to give 9α-fluoro-18-nor-D-homo-5α-13(17a)-androstene-11β-ol - 3,17 - dione 11-acetate, 9α-chloro-18-nor-D-homo-5α-13(17a)-androstene-11β-ol-3,17-dione 11-acetate, and 9α-bromo-18-nor-D-homo-5α-13(17a)-androstene-11β-ol-3,17-dione 11-acetate.

C. Other carboxylic acid esters and sulfonic acid esters of 18-nor-D-homo-5α - 13(17a) - androstene-11β-ol-3,17-dione and the 9α-fluoro, chloro, and bromo analogs thereof are obtained by utilizing the above procedure and substituting anhydrides of carboxylic acids such as caproic and propionic or the acid chloride of benzoic acid or of methylsulfonic or p-toluenesulfonic acid for acetic anhydride in the above procedure to obtain the corresponding esters, e.g., 18-nor-D-homo-5α-13(17a) - androstene-11β-ol-3,17-dione 11-caproate, 18-nor - D - homo-5α-13(17a)-androstene-11β-ol-3,17-dione 11-propionate and 18-nor-D-homo - 5α - 13(17a)-androstene-11β-ol-3,17-dione 11-benzoate, 18-nor-D-homo-5α-13(17a)-androstene-11β-ol-3,17-dione 11 - methanesulfonate, 18-nor-D-homo-5α-13-(17a)-androstene-11β-ol-3,17-dione 11-p-toluenesulfonate and the 9α-fluoro-, 9α-chloro-, and 9α-bromo-analogs thereof.

D. In a similar fashion, 18-nor-D-homo-5β-13(17a)-androstene - 11β-ol-3,17 - dione and the 9α-fluoro-, 9α-chloro-, and 9α-bromo- derivatives thereof may be reacted with acetic anhydride according to the procedure of Example 13A to give respectively 18-nor-D-homo-5β-13(17a)-androstene - 11β-ol-3,17 - dione 11-acetate, 9α-fluoro - 18 - nor-D-homo-5β-13(17a)-androstene-11β-ol-3,17-dione, 9α-chloro-18-nor-D-homo-5β-13(17a)-androstene-11β-ol-3,17-dione 11-acetate and 9α-bromo-18-nor-D-homo-5β-13(17a)-androstene-11β-ol-3,17-dione 11-acetate.

Similarly, by substituting other carboxylic acid anhydrides such as propionic, or acid chlorides, such as benzoyl chloride or p-toluenesulfonyl chloride, for acetic anhydride in the above procedure there is obtained the corresponding 11-propionate, 11-benzoate, or 11-p-toluenesulfonate of 18-nor-D-homo-5β-13(17a)-androstene-11β-ol-3,17-dione and of the 9α-fluoro-, 9α-chloro-, and 9α-bromo analogs thereof.

EXAMPLE 14

*Preparation of 3-monoesters of 3,11β-dihydroxy-18-nor-D-homo-13(17a)-androstenes*

One gram of 18-nor-D-homo-5α-13(17a)-androstene-3β,11β-diol-17-one dissolved in 20 ml. of pyridine containing 500 mg. of propionic anhydride and is allowed to stand at room temperature for two hours. The reaction mixture is then poured into cold dilute hydrochloric acid with stirring. Stirring is continued for 15 minutes longer. A solid separates which is filtered and crystallized from aqueous methanol to give 18-nor-D-homo-5α-13(17a)-androstene-3β,11β-diol-17-one 3-propionate.

In a similar manner, 18-nor-D-homo - 5β - 13(17a)-androstene-3α,11β-diol - 17 - one, 18-nor-D-homo-5α-13-(17a)-androstene-3α,11β-diol-17-one, 18-nor-D-homo-5β-13(17a)-androstene-3β,11β-diol-17-one and the 9α-fluoro-, 9α-chloro-, and 9α-bromo-derivatives thereof are each reacted with acetic anhydride in a manner similar to the above procedure to give respectively 18-nor-D-homo-5β-13(17a)-androstene-3α,11β-diol-17-one 3-acetate, 18-nor-D-homo-5α-13(17a)-androstene-3α,11β-diol-17-one 3-acetate, 18-nor-D-homo-5β-13(17a) - androstene-3β,11β-diol-17-one 3-acetate and the 9α-fluoro-, 9α-chloro-, and 9α-bromo-derivatives thereof, e.g., 9α-fluoro-18-nor-D-homo-5β-13(17a)-androstene-3α,11β-diol-17-one 3-acetate, 9α-fluoro-18-nor - D - homo-5α-13(17a)-androstene-3α,11β-diol-17-one 3-acetate and 9α-fluoro-18-nor-D-homo-5β-13(17a)-androstene-3β,11β-diol-17-one 3-acetate.

By substituting acid anhydrides such as valeric and caprylic anhydride or benzoyl chloride for propionic anhydride in the above procedure, there is obtained the corresponding ester, i.e., the 3-valerate, 3-caprylate, and 3-benzoate respectively, of 18-nor-D-homo-5α-13(17a)-androstene-3β,11β-diol-17-one, 18-nor-D-homo - 5β - 13 (17a)-androstene-3α,11β-diol-17-one, 18-nor-D-homo-5α-

13(17a)-androstene-3α,11β-diol-17-one, 18-nor-D-homo-5β-13(17a)-androstene-3β,11β-diol-17-one, and the 9α-fluoro-, 9α-chloro-, and 9α-bromo- derivatives thereof.

EXAMPLE 15

*3,11-diesters of 3,11β-dihydroxy-18-nor-D-homo-13(17a)-androstenes*

A. *18-nor-D-homo-5α-13(17a)-androstene-3β,11β-diol-17-one diacetate.*—To 500 mg. of 18-nor-D-homo-5α-13(17a)-androstene-3β,11β-diol-17-one 3-acetate in 10 ml. of pyridine is added 500 mg. of acetic anhydride. The reaction mixture is left at room temperature overnight then is poured into cold dilute hydrochloric acid with stirring. A solid separates which is filtered and crystallized from aqueous methanol to give 18-nor-D-homo-5α-13(17a)-androstene-3β,11β-diol-17-one diacetate.

Alternatively, the compound of this example is prepared as follows:

100 mg. of 18-nor-D-homo-5α-13(17a)-androstene-3β,11β-diol-17-one is dissolved in 2 ml. of pyridine containing 200 mg. of acetic anhydride. The reaction mixture is left overnight at room temperature then poured into cold dilute hydrochloric acid with stirring. A solid separates which is filtered and dried to give 18-nor-D-homo-5α-13(17a)-androstene-3β,11β-diol-17-one diacetate.

In a similar fashion, by utilizing the procedure in the first paragraph of this example on the 3-acetates prepared in Examples 2, 6, 8, 9, and 11, or by utilizing the alternative procedure described above on the corresponding 3,11-dihydroxy-compounds prepared in Example 12, there are obtained the corresponding 3,11-diacetate esters.

By substituting benzoyl chloride or the anhydride of another alkanoic acid such as valeric and caprylic for acetic anhydride in the above alternate procedure there is obtained the corresponding 3,11-dibenzoate or 3,11-divalerate and 3,11-dicaprylate of the respective 18-nor-D-homo-13(17a)-androstene-3,11β-diol-17 - one starting steroid.

B. *Mixed esters.*—To 100 mg. of 18-nor-D-homo-5α-13(17a)-androstene-3β,11β-diol-17-one 3 - acetate (the compound of Example 1) in 2 ml. of pyridine is added 50 mg. of caproic anhydride. The mixture is allowed to stand at room temperature for six hours, then poured into dilute aqueous hydrochloric acid with stirring. The resultant solid is filtered and dried to give 18-nor-D-homo-5α-13(17a)-androstene-3β,11β-diol - 17 - one 3-acetate 11-caproate.

In a similar fashion, 18-nor-D-homo-13(17a)-androstene-3β,11β-diol-17-one 3 - benzoate (prepared as described in Example 14) is reacted with acetic anhydride in pyridine overnight. The resultant product is isolated to give 18-nor-D-homo-5α-13(17a)-androstene - 3β,11β-diol-17-one 3-benzoate 11-acetate.

In like manner, by substituting other 18-nor-D-homo-13(17a)-androstene-3,11β-diol-17-one 3 - monoesters in place of the 18-nor-D-homo-5α-13(17a)-androstene-3β,11β-diol-17-one 3-acetate utilized in the above procedures there is obtained the corresponding 11-caproate or 11-acetate, respectively, of the starting steroid at 3-monoester.

It is obvious, that depending on the choice of starting steroid and acid anhydride or acid halide reagent used that various combinations of 3,11-mixed esters may be obtained.

It is to be understood, that the invention is not to be limited to the exact details of operation or exact compounds shown or described as obvious modifications and equivalents will be apparent to one skilled in the art. The invention is therefore to be limited only by the scope of the appended claims.

We claim:

1. A compound selected from the group consisting of 3-Z-9α-X-11β-Y-17-keto-18-nor-D-homo-13(17a) - dehydro-5α-androstane and 3-Z-9α-X-11β-Y-17-keto-18-nor-D-homo-13(17a)-dehydro-5β-androstane wherein Z is a member selected from the group consisting of keto; (H,βOR') and (H,αOR'), R' being a member selected from the group consisting of hydrogen and an acyl radical of a hydrocarbon carboxylic acid having up to 8 carbon atoms selected from the group consisting of alkanoic acids and aryl carboxylic acids; X is a member selected from the group consisting of hydrogen, fluorine, chlorine, and bromine; and Y is a member selected from the group consisting of hydroxy and OR, R being an acid radical of a hydrocarbon carboxylic acid having up to 8 carbon atoms selected from the group consisting of alkanoic acids and aryl carboxylic acids.

2. 3-OR-11β-hydroxy-17-keto-18-nor-D-homo-13(17a)-dehydroandrostane having saturated A, B, and C-rings and a hydrogen atom at C–5, said hydrogen atom being in one of the configurations selected from the group consisting of α and β, wherein R is an acid radical of a hydrocarbon carboxylic acid having up to 8 carbon atoms selected from the group consisting of alkanoic acids and aryl carboxylic acids.

3. 11β-OR-18-nor-D-homo-13(17a)-androstene - 3,17-dione having saturated A, B, and C-rings and a hydrogen atom at C–5, said hydrogen atom being in one of the configurations selected from the group consisting of 5α and 5β, and wherein R is an acid radical of a hydrocarbon carboxylic acid having up to 8 carbon atoms selected from the group consisting of alkanoic acids and aryl carboxylic acids.

4. 3,11β-di(OR)-17-keto-18-nor-D-homo-13(17a) - dehydroandrostane having saturated A, B, and C-rings and a hydrogen atom at C–5, said hydrogen atom being in one of the configurations selected from the group consisting of 5α and 5β, wherein R is an acid radical of a hydrocarbon carboxylic acid having up to 8 carbon atoms selected from the group consisting of alkanoic acids and aryl carboxylic acids.

5. 18-nor-D-homo-5α-13(17a)-androstene-11β-ol-3,17-dione.

6. 18-nor-D-homo-5β-13(17a)-androstene-11β-ol-3,17-dione.

7. 18-nor-D-homo-5α-13(17a)-androstene-3β,11β-diol-17-one.

8. 18-nor-D-homo-5α-13(17a)-androstene-3β,11β-diol-17-one 3-acetate.

9. 18-nor-D-homo-5α-13(17a)-androstene-3β,11β-diol-17-one diacetate.

10. 9α-fluoro-18-nor-D-homo-5α-13(17a) - androstene-3β,11β-diol-17-one.

11. 18-nor-D-homo-5α-13(17a)-androstene-3α,11β-diol-17-one.

12. 18-nor-D-homo-5β-13(17a)-androstene-3α,11β-diol-17-one.

13. 18-nor-D-homo-5β-13(17a)-androstene-3β,11β-diol-17-one.

14. In the process of preparing a compound selected from the group consisting of 3-Z-9α-X-11β-Y-17-keto-18-nor-D-homo-13(17a)-dehydro-5α-androstane and 3-Z-9α-X-11β-Y-17-keto-18-nor-D-homo-13(17a)-dehydro - 5β-androstane, wherein Z is a member selected from the group consisting of keto, (H,βOR') and H,αOR'), R' being a member selected from the group consisting of hydrogen and an acyl radical of a hydrocarbon carboxylic acid having up to 8 carbon atoms selected from the group consisting of alkanoic acids and aryl carboxylic acids;

X is a member selected from the group consisting of hydrogen, fluorine, chlorine, and bromine; and Y is a member selected from the group consisting of hydroxy and OR, R being an acid radical selected from the group consisting of methanesulfonic acid, p-toluene-sulfonic acid and a hydrocarbon carboxylic acid having up to 8 carbon atoms selected from the group consisting of alkanoic acids and aryl carboxylic acids;

the steps which comprise irradiating an 11-nitrite ester of a steroid selected from the group consisting of 3-Z-9α-X-11β-hydroxy-17-keto-5α - androstane and 3-Z-9α-X-11β-hydroxy-17-keto-5β-androstane wherein Z and X are as hereinabove defined, in an inert solvent, with ultraviolet radiation having a wave length greater than about 3000 A. and less than about 4400 A., said radiation including an absorption band of said 11-nitrite radical, and isolating the thereby formed 3-Z-9α-X-11β-hydroxy-17-keto-18 - nor - D-homo-13(17a)-dehydro) androstane.

References Cited by the Examiner

UNITED STATES PATENTS

| | | | |
|---|---|---|---|
| 2,727,057 | 12/55 | Park | 260—456 |
| 2,728,788 | 12/55 | Waldron et al. | 260—456 |
| 2,847,457 | 8/58 | Johnson et al. | 260—488 |
| 2,936,276 | 5/50 | Chalkey | 204—158 |
| 2,941,934 | 6/60 | Anspon et al. | 204—158 |
| 3,024,271 | 3/62 | Amiard et al | 260—586 |

OTHER REFERENCES

Johnson et al., J.A.C.S., vol. 78, pp. 6339–6347 (1956).

CHARLES B. PARKER, *Primary Examiner.*

JOSEPH P. BRUST, *Examiner.*